Aug. 7, 1923.
W. H. THOMPSON
1,464,301
FILLER CAP FOR OIL TANKS
Filed Sept. 2, 1920
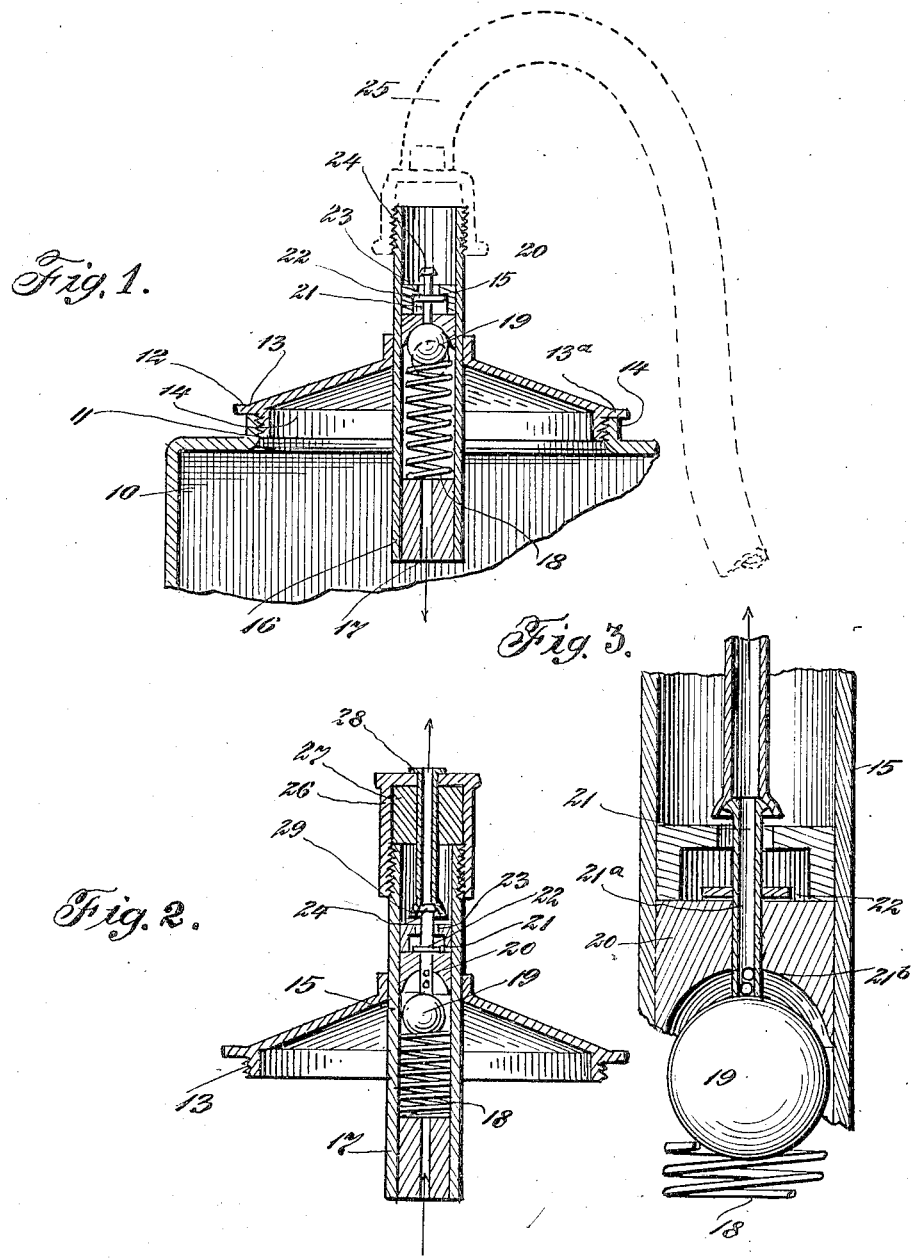
Inventor
William H. Thompson.
By Attorney Patented Aug. 7, 1923.

1,464,301

UNITED STATES PATENT OFFICE.

WILLIAM H. THOMPSON, OF MINTURN, COLORADO.

FILLER CAP FOR OIL TANKS.

Application filed September 2, 1920. Serial No. 407,795.

*To all whom it may concern:*

Be it known that I, WILLIAM H. THOMPSON, citizen of the United States, and resident of Minturn, in the county of Eagle and State of Colorado, have invented certain new and useful Improvements in Filler Caps for Oil Tanks, of which the following is a specification.

This invention relates to tanks for fuel oils and particularly tanks for gasoline used in connection with internal combustion engines and motors and as especially applied to automobiles, but it may be used for any purpose where it is desired to retain oil or other liquid substance in a reservoir or tank under compression, or without pressure. The object of the invention is primarily to make it possible to utilize oil to the full capacity of a tank for generating power by a motor or engine which uses oil for fuel, and a further object is to provide means for admitting a sufficient degree of air to the tank to cause a free flow of the oil as required for combustion when there is a quantity of oil in the tank. Further objects are to provide a device of the kind simple and inexpensive of construction and which may apply to any tank of the types ordinarily in use, and a further object is to provide a device of the kind which may be used in conjunction with an air pump of the type that is generally used for inflating pneumatic tires of automobiles of motor cyles.

With these and others objects in view reference may be had to the accompanying drawings, in which Figure 1 is a vertical sectional view of the device as applied to a gasoline tank, the parts thereof being shown in the position they assume when air is retained in the tank under pressure. The rubber tube for filling the tank by means of the air pump is shown in position for use in dotted lines. Figure 2 is a sectional view of the filler cap alone showing the parts in the position they assume when the tank has a sufficient quantity of oil therein not to require any compression, or at any time when it is desired to admit air thereto not under pressure, or to permit air to escape from the tank. Figure 3 is an enlarged detail sectional view showing more clearly the construction of certain parts of the device. In the several views of the drawings similar reference numerals refer to similar parts.

The numeral 10 indicates the tank and 11 the threaded flange forming a seat for the filler cap 12 which has the threaded flange 13 thereon, which is threaded into the seat 11 of the tank, and also the flange $13^a$ which engages the edge of the seat 11 forming a tight seal for the cap. Packing means may be provided in the joint as 14 if desired. A tubular member 15 is disposed in a vertical position centrally through the cap and is enclosed at the lower end portion thereof by a plug 16 having a passage 17 thereto. A helical spring 18 is retained in the tubular member by the plug 16 and a ball 19 is superposed upon the upper portion of the spring. A concave valve seat 20 is disposed in the tubular member substantially centrally thereof, above the ball 19, and is adapted to closely fit the surface of the ball which together form meeting parts of a ball and socket valve. The ball is normally held by a helical spring in close contact with the concave valve seat as shown in Figure 1. A central opening is provided through the valve seat 20, and a tubular conduit for air, 21, is vertically disposed therethrough. A flange or washer 22 is disposed around the conduit 21 and is adapted to rest upon the upper surface of the valve seat 20 when the conduit is lowered. A bridge 23 is disposed over the washer 22 and rests upon the upper surface of the valve seat 20 and limits the upward movement of the conduit 21 and the washer 22. A lip or flange is provided on the upper end of the conduit 21 which is of a size suitable to pass through the opening 24 of the bridge 23 for convenience in assembling the parts. When there is air in the tank under pressure the helical spring 18 forces the valve ball 19 into its seat in the concave valve member 20 and prevents the escape of any air whatever, but when it is desired to force air into the tank the air tube 25 indicated by dotted lines is applied and the air is pumped through it through the tubular member of the filler cap into the tank. The air passes through the conduit 21 through the passage $21^a$ therethrough and forces the ball 19 downwardly from its seat. The conduit 21 may then descend so that the plate 22 rests upon the upper surface of the concave valve seat 20. The air passing therethrough then may escape through openings $21^b$ and thence into the tank around the ball 19 through the plug 16 and passage 17 therethrough. When the pressure from the air pump is removed the ball 19 is forced upwardly by the spring 18 and the valve is closed preventing the escape of the compressed air. The result of the air pressure upon the fuel is as follows:

When the fuel oil is low in the tank the flow thereof to the carburetor and combustion chamber of the motor is uncertain if there be any flow whatever, but when air under sufficient pressure fills the tank the fuel is forced to pass through any means of egress or ports provided from the tank, so that while there remains any fuel in the tank a reliable flow thereof to the combustion chamber of the motor is certain.

When the tank is well supplied with oil there is not ordinarily any necessity for this pressure to insure a flow thereof to the motor, and in such case the flow is more satisfactory if a supply of air is afforded. This is provided in the manner described as follows:

Referring to Figure 2 of the drawing the cap 26 is shown applied to the upper end of the tubular member 15 of the filler cap. Packing is provided in the cap 26 as 27, which may be elastic material or more solid substance. The cap is preferably threaded on to the tubular member 15 of the filler cap. In the top of the cap 26 is provided an opening and a tubular member 28 is seated therein which extends inwardly through the cap 26 and on the inward end the tubular member is enlarged as at 29, forming a flaring seat to receive the lip or flange 24 of the tubular conduit 21 before described. When the cap 26 is threaded on to the upper end of the tubular member 15 of the filler cap the seat 29 of the tubular member 28 engages the lip 24 of the tubular conduit 21 and forces it downwardly until the flange or washer 22 rests upon the upper surface of the concave valve seat 20, thus forcing the valve ball 19 downwardly compressing the spring 18 and permitting the air from the tank to flow upwardly through the passage 17 of the plug 16 around the ball 19 through the tubular conduit member 21 and the tubular member 28 of the cap 26 to the open air. As the liquid fuel in the tank is lowered the air may be admitted to fill the space therein not occupied by the fuel.

While I have described the form of my invention shown in the drawings, I do not wish to limit myself thereto, but reserve the right to depart therefrom within the reasonable scope and spirit of my invention.

Having thus described my invention, what I claim as new therein and desire to secure by Letters Patent of the United States is:

1. In a tank closure the combination of an air valve comprising a cylindrical housing, a normally spring closed valve member within said housing, a reciprocating tubular air passage closed by said valve member when same is seated, said air passage having lateral ports which are opened when said valve is unseated, and means for adjustably operating said air passage.

2. In a tank closure the combination of an air valve comprising a cylindrical housing, a normally spring-closed valve member within said housing, a reciprocating tubular air passage closed by said valve when same is seated, said air passage having lateral ports which are opened when said valve is unseated, and a screw cap on said housing, said cap having a tubular passage which communicates with said reciprocating passage, whereby said reciprocating passage may be adjusted by turning the cap.

3. In a tank closure the combination of an air valve comprising a tubular housing containing a spring-closed spherical valve member, means for opening said valve, whereby air may be admitted therethrough, said means consisting of a reciprocating air passage, the movement of said reciprocating passage opening said valve member, against the tension of its spring and means for adjusting said air passage in various positions, where the supply of air may be regulated.

Signed at Leadville, in the county of Lake and State of Colorado, this 19th day of July, A. D. 1920.

WILLIAM H. THOMPSON.